(12) United States Patent
Lehenbauer et al.

(10) Patent No.: US 7,500,186 B2
(45) Date of Patent: Mar. 3, 2009

(54) SYSTEMS AND METHODS FOR EFFICIENTLY GENERATING TABLE LAYOUTS USING MOVEABLE ITEMS

(75) Inventors: Daniel Ryan Lehenbauer, Redmond, WA (US); Jeffrey Thomas Chrisope, Kirkland, WA (US); Jessica Lynn Fosler, Redmond, WA (US); Jian Yuan, New Haven, CT (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 10/929,861

(22) Filed: Aug. 30, 2004

(65) Prior Publication Data

US 2006/0048045 A1 Mar. 2, 2006

(51) Int. Cl.
*G06F 17/00* (2006.01)
(52) U.S. Cl. .................. 715/243; 715/762; 715/234
(58) Field of Classification Search .......... 715/500, 715/505, 507–509, 234, 227, 762, 840, 842, 715/744, 243
See application file for complete search history.

(56) References Cited

U.S. PATENT DOCUMENTS

| | | | |
|---|---|---|---|
| 5,446,575 A | 8/1995 | Lysakowski, Jr. | 707/104.1 |
| 5,742,832 A * | 4/1998 | Buxton et al. | 713/322 |
| 5,835,917 A * | 11/1998 | Shin et al. | 715/509 |
| 5,873,106 A * | 2/1999 | Joseph | 715/506 |
| 6,014,679 A * | 1/2000 | Tomioka et al. | 715/501.1 |
| 6,088,708 A | 7/2000 | Burch et al. | 715/509 |
| 6,392,673 B1 | 5/2002 | Andrew et al. | 345/800 |
| 6,626,959 B1 | 9/2003 | Moise et al. | 715/522 |
| 6,826,727 B1 * | 11/2004 | Mohr et al. | 715/517 |
| 2004/0168130 A1 * | 8/2004 | Ishizaki | 715/530 |
| 2004/0187079 A1 * | 9/2004 | Yamada et al. | 715/517 |
| 2005/0071781 A1 * | 3/2005 | Atkins | 715/838 |
| 2005/0094207 A1 * | 5/2005 | Lo et al. | 358/1.18 |
| 2005/0120293 A1 * | 6/2005 | Benhase et al. | 715/504 |
| 2006/0193008 A1 * | 8/2006 | Osaka et al. | 358/1.18 |
| 2006/0224952 A1 * | 10/2006 | Lin | 715/517 |

OTHER PUBLICATIONS

Anderson, R. J. et al., "The Table Layout Problem," *Proceedings of the Fifteenth Annual Symposium on Computational Geometry*, Miami, Florida, Jun. 13-16, 1999, 115-123.

(Continued)

*Primary Examiner*—Thu Huynh
(74) *Attorney, Agent, or Firm*—Woodcock Washburn LLP

(57) ABSTRACT

An API is provided for positioning items in a table. The API allows a number of columns or a number of rows, or both, to be specified for a table. Any items to be placed in the table may be identified for the API. Items may be "moveable," or not associated with fixed positions in the table. The moveable items may be placed adjacently in the table to fill a first row. New rows or columns may be generated to accommodate additional items. Items may also be "fixed," or associated with fixed positions in the table. Moveable items may fill in around the fixed items. A novel algorithm is provided to efficiently place both moveable and fixed items in a table. An on-demand reservation grid may be used in conjunction with the algorithm, thereby accommodating items that span multiple columns and/or rows.

28 Claims, 15 Drawing Sheets

1400

OTHER PUBLICATIONS

Hurst, M. et al., "Layout and Language: Preliminary Investigations in Recognizing the Structure of Tables," *Proceedings of the Fourth International Conference on Document Analysis and Recognition*, Ulm, Germany, Aug. 18-20, 1997, vol. 2, 1043-1047.

Shang-Rong, R. et al., "Nested Table Layout Based on Object-Oriented Template," *J. Computer Aided Design & Computer Graphics*, 2000, 12(9), 705-710 (English language abstract included).

Shin, K.-H. et al., "Tafel Musik: Formatting Algorithm of Tables," *Mathematical and Computer Modelling*, 1997, 26(1), 97-112.

"Class GridBagLayout," http://java.sun.com/j2se/1.3/docs/api/java/awt/GridBagLayout.html, 1993, 15 pages.

U.S. Appl. No. 10/815,067, filed Mar. 31, 2004, Young et al.

* cited by examiner

SYSTEMS AND METHODS FOR EFFICIENTLY GENERATING TABLE LAYOUTS USING MOVEABLE ITEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

This invention relates to computing, and further relates to the positioning of items in tabular layouts for display on a Graphical User Interface (GUI).

BACKGROUND OF THE INVENTION

A Graphical User Interface (GUI) is an area of an electronic display surface, such as 129 in FIG. 1a, that allows users of an application to access various functions provided by an application. Typically, a GUI 130 will present a viewer with a plurality of items 131-144 in a tabular layout 150. These items 131-144 may be menu items or control buttons that provide specific application functions. For example, in FIG. 1, item 131 may provide a viewer with a drop-down menu allowing the viewer to open a new file, save a file, print a file, and so on. Item 135 may allow a user to bypass the drop-down menu and save a file with a single selection.

In the case of table 150, the layout of items 131-144 is determined by supporting processes that are accessed via an Application Programming Interface (API). A creator of a GUI can write code that is recognized by the API, and can thereby control the features of the resulting GUI. To facilitate the creation of such code, programmers may make use of a GUI development environment. A GUI development environment is an application that provides useful functions to assist in the creation of the code behind GUIs. Such a development environment is available in a variety of different products, such as the MICROSOFT® .NET framework. A GUI development environment may be an aspect of a larger integrated development environment (IDE), such as MICROSOFT'S VISUAL STUDIO®, BORLAND'S C++ BUILDER®, METROWERK'S CODE WARRIOR®, and IBM'S WEBSPHERE STUDIO®.

Almost all modern GUI development environments provide assistance in generating table layouts, sometimes also called grid layouts. An exemplary table layout in addition to 151 in FIG. 1a is provided in FIG. 1b. The table 115 comprises a plurality of items 100-110 that are positioned within the table 115. Traditionally, to initialize a table 115 for an application GUI, rows are added to the table, followed by adding cells to the rows, and finally adding items to the cells. In the case of creating a GUI using the Hyper Text Markup Language (HTML), this process is relatively easy. For example, the following is an example of the code necessary to create a simple, one row table with two items, or buttons, in HTML:

```
<table>
  <tr>
    <td>Button1</td>
    <td>Button2</td>
  </tr>
</table>
```

While HTML provides a convenient way to create tables in some settings, the typical application GUI, such as 130, is not defined in HTML. Instead, an application GUI 130 may be defined in code. The creation of the code for a GUI is not as simple as the HTML scenario. Consider, for example, the table with one row and two buttons from the HTML example above. In code, the creation of the same table with the same layout is more verbose and difficult to follow:

```
Table table = new Table( );
// Create row
TableRow row1 = new TableRow( );
// Create cells
TableCell cell1 = new TableCell( );
TableCell cell2 = new TableCell( );
// Add cells to row
row1.Cells.Add(cell1);
row1.Cells.Add(cell2);
// Add controls to cells
cell1.Add(new Button( ));
cell2.Add(new Button( ));
```

As pointed out by the comments in the above example—comments are on lines preceded by two forward slashes—the creation of the GUI with two buttons in code involves a sequence of steps. These steps are illustrated in FIG. 1c. In general, the process involves first creating the table 120, then creating the row 121, then creating the cells 122, then adding the cells to the row 123, and finally adding items, also called controls or buttons, to the cells 124. As can also be seen in FIG. 1c, this process involves a deliberate creation of new rows and cells to accommodate new items. If additional items are desired for a table, then a new cell must be placed in the table if there is sufficient space in the row to accommodate the item. If there is not sufficient space, a new row must first be created, then a new cell, and so on. This deliberate creation of new locations for additional items is represented by the decision 126 in FIG. 1c.

Using a variety of APIs available in the art, the code for the creation of a particular tabular layout may take a wide variety of forms. One popular API is the Grid Bag Layout API, also called the Grid Bag Layout Engine, provided by SUN MICROSYSTEMS®. Using the Grid Bag Layout API, the following code can be used to generate the layout shown in FIG. 1b:

```
protected void makebutton(String name,
            GridBagLayout gridbag,
            GridBagConstraints c) {
  Button button = new Button(name);
  gridbag.setConstraints(button, c);
  add(button);
}
public void init( ) {
  GridBagLayout gridbag = new GridBagLayout( );
  GridBagConstraints c = new GridBagConstraints( );
  setFont(new Font("Helvetica", Font.PLAIN, 14));
```

-continued

```
setLayout(gridbag);
c.fill = GridBagConstraints.BOTH;
c.weightx = 1.0;
makebutton("Button1", gridbag, c);
makebutton("Button2", gridbag, c);
makebutton("Button3", gridbag, c);
c.gridwidth = GridBagConstraints.REMAINDER; //end row
makebutton("Button4", gridbag, c);
c.weightx = 0.0;                //reset to the default
makebutton("Button5", gridbag, c); //another row
c.gridwidth = GridBagConstraints.RELATIVE; //next-to-last in row
makebutton("Button6", gridbag, c);
c.gridwidth = GridBagConstraints.REMAINDER; //end row
makebutton("Button7", gridbag, c);
c.gridwidth = 1;                //reset to the default
c.gridheight = 2;
c.weighty = 1.0;
makebutton("Button8", gridbag, c);
c.weighty = 0.0;                //reset to the default
c.gridwidth = GridBagConstraints.REMAINDER; //end row
c.gridheight = 1;               //reset to the default
makebutton("Button9", gridbag, c);
makebutton("Button10", gridbag, c);
setSize(300, 100);
}
```

Using the Grid Bag Layout Engine, items can be associated with a plurality of constraints that operate to determine the positions and sizes of the items. For example, the GridBagConstraints.REMAINDER constraint operates to specify that an item be the last one in its row (for gridwidth) or column (for gridheight). The GridBagConstraints.RELATIVE constraint operates to specify that an item be the next to last one in its row (for gridwidth) or column (for gridheight). While the system of associating items with constraints to determine their positions useful in many respects, it ultimately leads to more complicated coding than is necessary for many GUIs, while at the same time burdening a system with extra computational costs and leading to less flexibility in adding items to a GUI at a later time.

In light of the aforementioned shortcomings in the art, a new API is desired that allows for simpler coding of tabular layouts. In addition, the API should maximize performance while minimizing the computational resources needed to generate tabular layouts.

SUMMARY OF THE INVENTION

In consideration of the above-identified shortcomings of the art, the present invention provides improved systems and methods for positioning items in a tabular layout. An API is provided for positioning items in a table. The API allows a number of columns or a number of rows, or both, to be specified for a table. Any items to be placed in the table may be passed to the API. Items may be "moveable," or not associated with fixed positions in the table. The moveable items may be placed adjacently in the table to fill a first row, in the case where a number of columns is specified, or to fill a first column, in the case where a number of rows is specified. New rows or columns may be generated to accommodate additional items. Items may also be "fixed," or associated with fixed positions in the table. Fixed items may be placed at their fixed location, while moveable items are positioned to fill in around the fixed items. A novel algorithm is provided to efficiently place both moveable and fixed items in a table. A dynamic reservation grid may be used in conjunction with the algorithm to reserve positions in the table, thereby accommodating items that span multiple columns and/or rows. Other advantages and features of the invention are described below.

BRIEF DESCRIPTION OF THE DRAWINGS

The systems and methods for efficiently generating table layouts using moveable items in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following detailed description will generally follow the summary of the invention, as set forth above, further explaining and expanding the definitions of the various aspects and embodiments of the invention as necessary. First, the operation of the novel API and exemplary code to access the functions thereof are set forth. Second, the algorithm for placing moveable and fixed items in a table is further explained.

Figure 3A:
FIG. 3a provides a graphical representation of a table definition in code that may be passed to the API of the invention. The exemplary table definition has three columns.
Figure 3B:
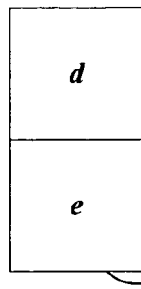
FIG. 3b provides a graphical representation of a table definition in code that may be passed to the API of the invention. The exemplary table definition has two rows.
Figure 3C:
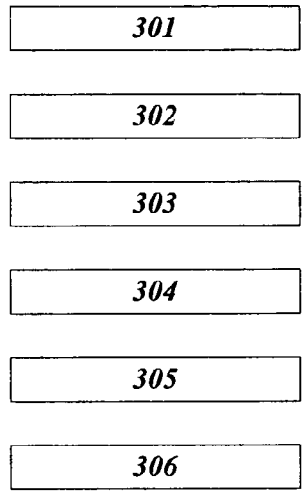
FIG. 3c provides a graphical representation of a plurality of moveable item identifications in code that may be passed to the API of the invention.

Various embodiments of the contemplated API allow for a streamlined specification of a table property—either a number of rows or a number of columns, and an identification of items to include. The API can then use this information to generate a table layout. Various aspects of the invention may be understood with reference to FIG. 3a-3c, which graphically correspond to the exemplary code for use in generating a table layout set forth below:

```
// To define a table with 3 columns such as that of FIG. 3a
Table.Columns = 3;
//The following six items correspond to the six items in FIG. 3c
// Because the table has 3 columns, the first three items
will appear in Row d (the first row)
Table.Controls.Add(button1);
Table.Controls.Add(button2);
Table.Controls.Add(button3);
// Because the table has 3 columns, the next three items
will appear in Row e (the second row)
Table.Controls.Add(button4);
Table.Controls.Add(button5);
Table.Controls.Add(button6);
```

Figure 3D:
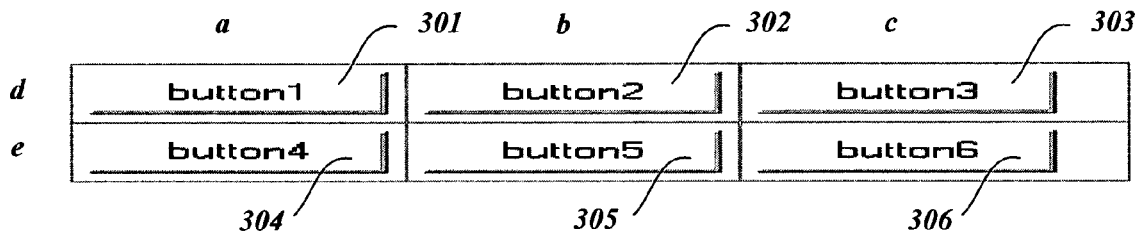
FIG. 3d illustrates a table that can be generated by the API of the invention through combining the moveable items in FIG. 3c and the table definition in FIG. 3a FIG. 3e illustrates a table that can be generated by the API of the invention through combining the moveable items in FIG. 3c and the table definition in FIG. 3b.

Embodiments of the API can take the simple code above and create the table layout of FIG. 3d. The API may first create a table with the specified number of columns. The result of such an operation is depicted in FIG. 3a. Next, the API can place a first identified item, such as 301 from FIG. 3c, into a first position in the table, such as the position with coordinates a,d in FIG. 3d. Note, however, that at the time of placing the first item 301 in this example, the API need not generate row e. The API may then move down the list of identified items, placing each horizontally adjacently to the previous item. The API may thus place items 301, 302, and 303 in row d of FIG. 3d. When the first row is full, i.e., the specified number of columns have been filled with items, the API may generate a new row, for example, row e in FIG. 3d, and begin placing items in a first position in the new row. This process may be repeated as necessary to accommodate all the identified items, e.g., items 301-306.

The example above may be altered slightly to work with a specified number of rows instead of a specified number of columns. FIG. 3b represents a table with a specified number of rows, namely two. The API may first create a table with the specified number of rows. The result of such an operation is depicted in FIG. 3b. Next, the API can place a first identified item, such as 301 from FIG. 3c, into a first position in the table, such as the position with coordinates a,d in FIG. 3d. Note, however, that at the time of placing the first item 301 in this example, the API need not generate column b. The API may then move down the list of identified items, placing each vertically adjacently to the previous item. The API may thus place items 301 and 302 in column a of FIG. 3d. When the first column is full, i.e., the specified number of rows have been filled with items, the API may generate a new column, for example, column b in FIG. 3d, and begin placing items in a first position in the new column. This process may be repeated as necessary to accommodate all the identified items, e.g., items 301-306.

Various embodiments of the API may be advantageously configured to allow each cell to contain no more than one item. To put multiple items in a cell, a nested a container, such as another table, may be identified as a single item and placed in the cell.

Figure 3E:
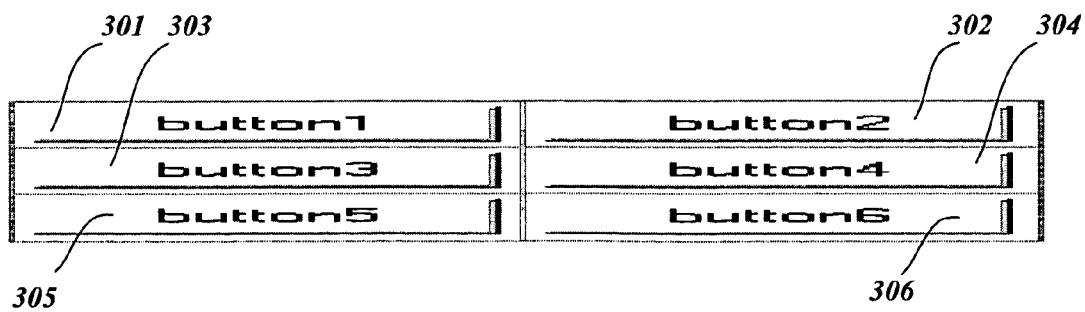

The items 301-306 used in the example above will be referred to as "moveable items." They are items which are inserted in column-wise or row-wise order, and can be moved as necessary to be placed adjacent to other items in a table. FIG. 3e represents a table with the same moveable items 301-306, except that the table of FIG. 3e has been defined as having only two columns. Alternatively, the table of FIG. 3e may be accomplished by specifying three rows and identifying items 301-306.

Note also that in the above scenario, where all items are moveable items, the order of placement of the items in the table impacts the layout of the table. For example, if item 302 were placed first, the table in FIG. 3d would look different. Item 302 would be in the top left corner, while item 301 would be to the position occupied by 302. Control over the location of items may be accomplished through intelligent choice of an appropriate number of columns, and through ordering the list of moveable items from which the API selects a next candidate for a position. Control may also be achieved through the use of items with fixed locations, as will be discussed further below.

Note that embodiments of the invention can place moveable items in a row-major, column-minor sequence, i.e., from left to right and from top to bottom. However, any other sequence is also considered suitable, e.g., a right to left sequence, or a sequence that is right to left and bottom to top, which would generate new rows above the filled rows, and so on.

Figure 4:
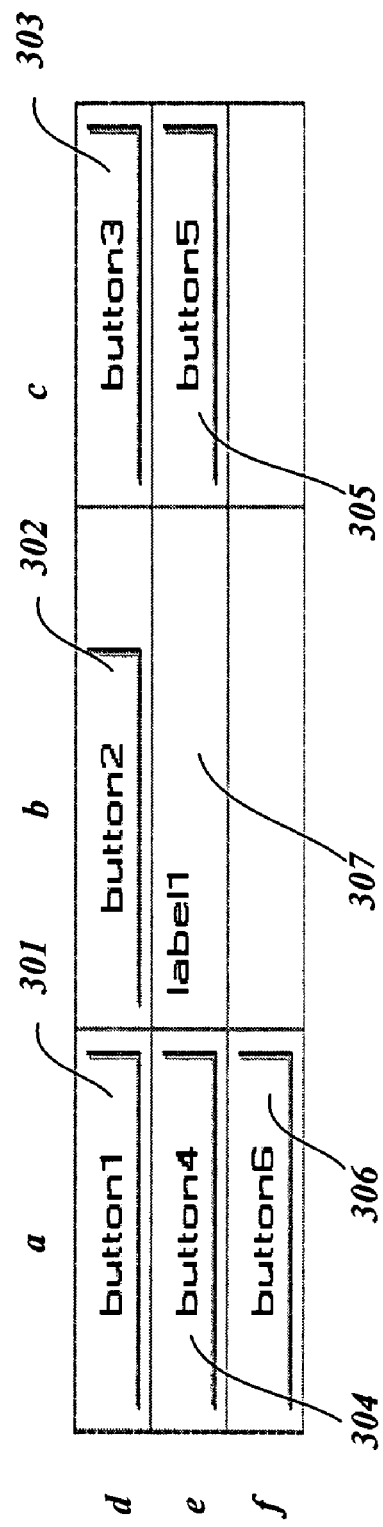
FIG. 4 illustrates a table that can be generated by the API of the invention through combining the moveable items in FIG. 3c along with a label with a fixed position, and the table definition in FIG. 3a FIG. 5 illustrates exemplary steps for creating a table with a plurality of items in a tabular layout. These steps generate code that is sufficient for use with the provided API.

The layout of the items in a table such as FIG. 3d or FIG. 3e may be altered by adding items such as labels, amongst the other items. It may also be altered by placing items at fixed locations in a table. For example, consider the situation where the following item with a fixed location is added to the exemplary code set forth above:
Table.Controls.Add(label1, 1, 1);

The effect of adding this label is depicted in FIG. 4. Because item 307 was inserted at the specified location, the other moveable items 301-306 have filled in around the item 307. In other words, the placement of the moveable items is substantially adjacent to a previous moveable item, but may be separated from a previously placed item due to the presence of an item or other item with coordinates identifying a fixed location.

The label item with a fixed position in the table, referred to as Label1 above, is an example of what will be referred to as a "fixed item". This is an item which has a fixed row and column position. As can be understood with reference to FIG. 4, both moveable items 301-306 and fixed items 307 may be identified for placement in a single table. Various embodiments of the invention allow moveable items to occupy the first cell in which they fit that is not already occupied by a fixed element.

It will be appreciated that the techniques described above may be used to create a more complicated table layout as well. Turning now to an exemplary use of the placement of items—here, moveable items as described generally above, compare the exemplary code below to the code needed to create the layout in FIG. 1b in the background section. The code below is shorter and much easier to understand:

```
this.tableLayoutPanel1.Columns = 4;
// row1
this.tableLayoutPanel1.Controls.Add(this.button1);
this.tableLayoutPanel1.Controls.Add(this.button2);
this.tableLayoutPanel1.Controls.Add(this.button3);
this.tableLayoutPanel1.Controls.Add(this.button4);
// row 2
this.tableLayoutPanel1.Controls.Add(this.button5);
this.tableLayoutPanel1.SetColumnSpan(this.button5, 4);
// row 3
this.tableLayoutPanel1.Controls.Add(this.button6);
this.tableLayoutPanel1.SetColumnSpan(this.button6, 3);
this.tableLayoutPanel1.Controls.Add(this.button7);
// row 4
this.tableLayoutPanel1.Controls.Add(this.button8);
this.tableLayoutPanel1.SetRowSpan(this.button8, 2);
this.tableLayoutPanel1.Controls.Add(this.button9);
this.tableLayoutPanel1.SetColumnSpan(this.button9, 3);
// row 5
this.tableLayoutPanel1.Controls.Add(this.button10);
this.tableLayoutPanel1.SetColumnSpan(this.button10, 3);
```

The above code introduces ColumnSpan and RowSpan. These are exemplary properties of items that may be used to define a size of items. In other words, these properties may set on an item to cause it to span more than one row or column. For example, Button5's ColumnSpan=4. Button8's RowSpan=2. Various embodiments of the invention may be configured to default items sizes to a size of one column width and one row height, or to any other column or row width and height. Thus, the size of items need not be specified, such as with Buttons 1-4 above, and the default size can be applied.

Figure 5:
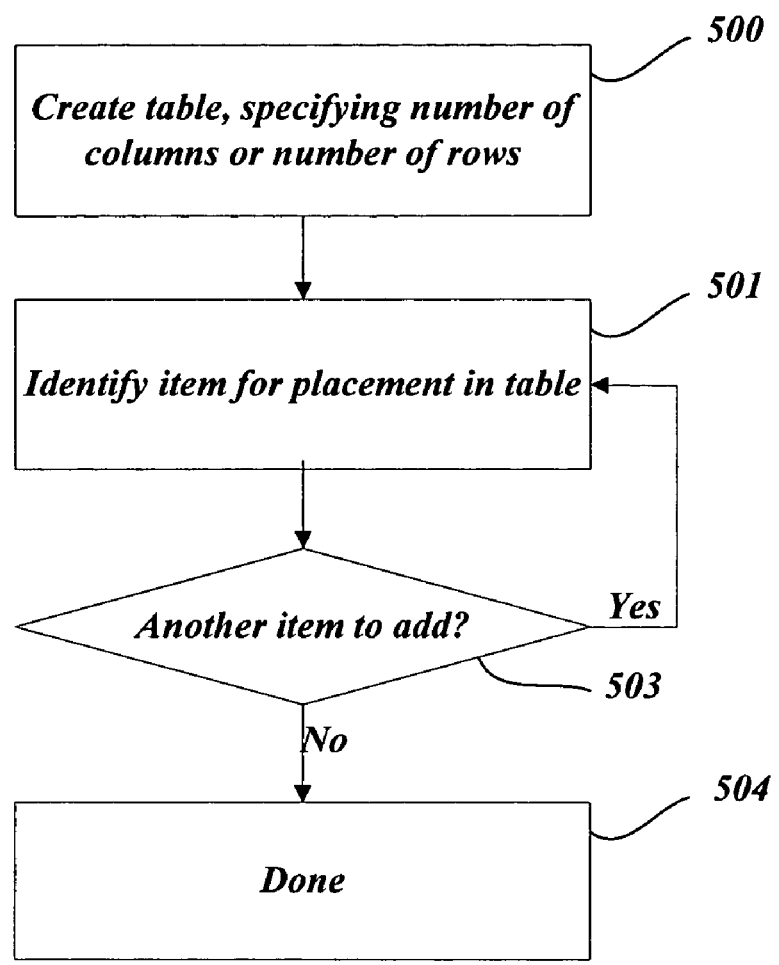

The simplicity of the coding effort in creating tables using an API with the features set forth here can be understood with reference to FIG. 5. First, a table can be created with a number of columns 500. Next, the plurality of items to be placed in the table can be identified 501, 503. In situations where all items are of uniform size, and items with fixed positions are not used, these simple steps 500, 501, 503 can be all that is necessary to build a table. In situations where items are of various sizes or fixed coordinates, the step of specifying a size and/or coordinates for the various items may be added to the steps illustrated in FIG. 5, as will be explained further with reference to FIG. 6.

Figure 6:
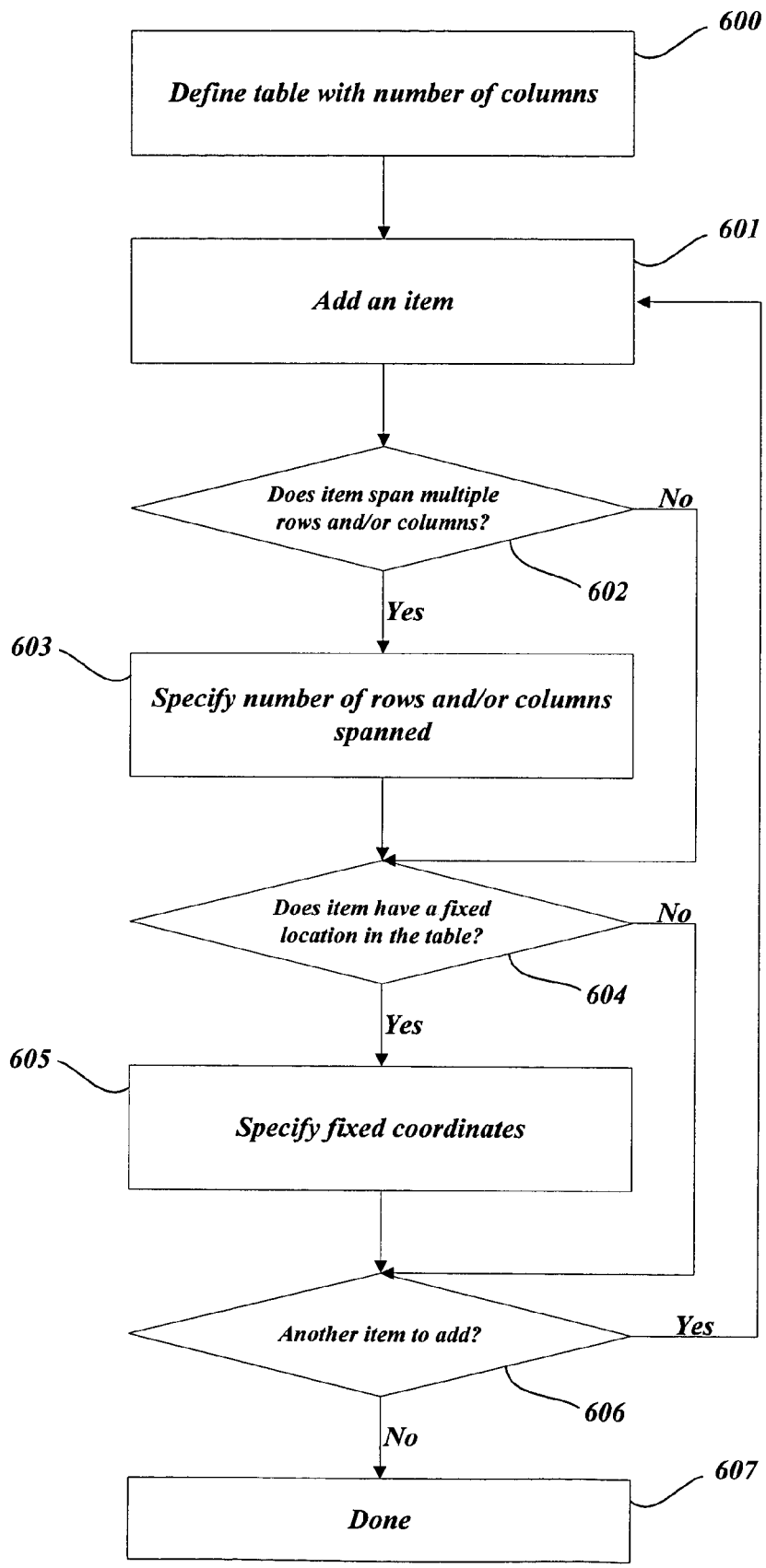
FIG. 6 illustrates a more detailed sequence of steps for generating the code for a table with a specified number of columns, wherein the code defines items of various sizes and items with fixed positions.

With reference to FIG. 6, a table may be defined with a number of columns 600. Next, as represented by steps 601-606, a plurality of items can be identified 601, each with a size defined by a number of columns and/or rows 602-603. A single row and single column items size can be a default size that does not require specification of an item size. Further, coordinates may be specified for items with fixed positions 604-605. Items without coordinates may be considered moveable items as a default.

Figure 7:
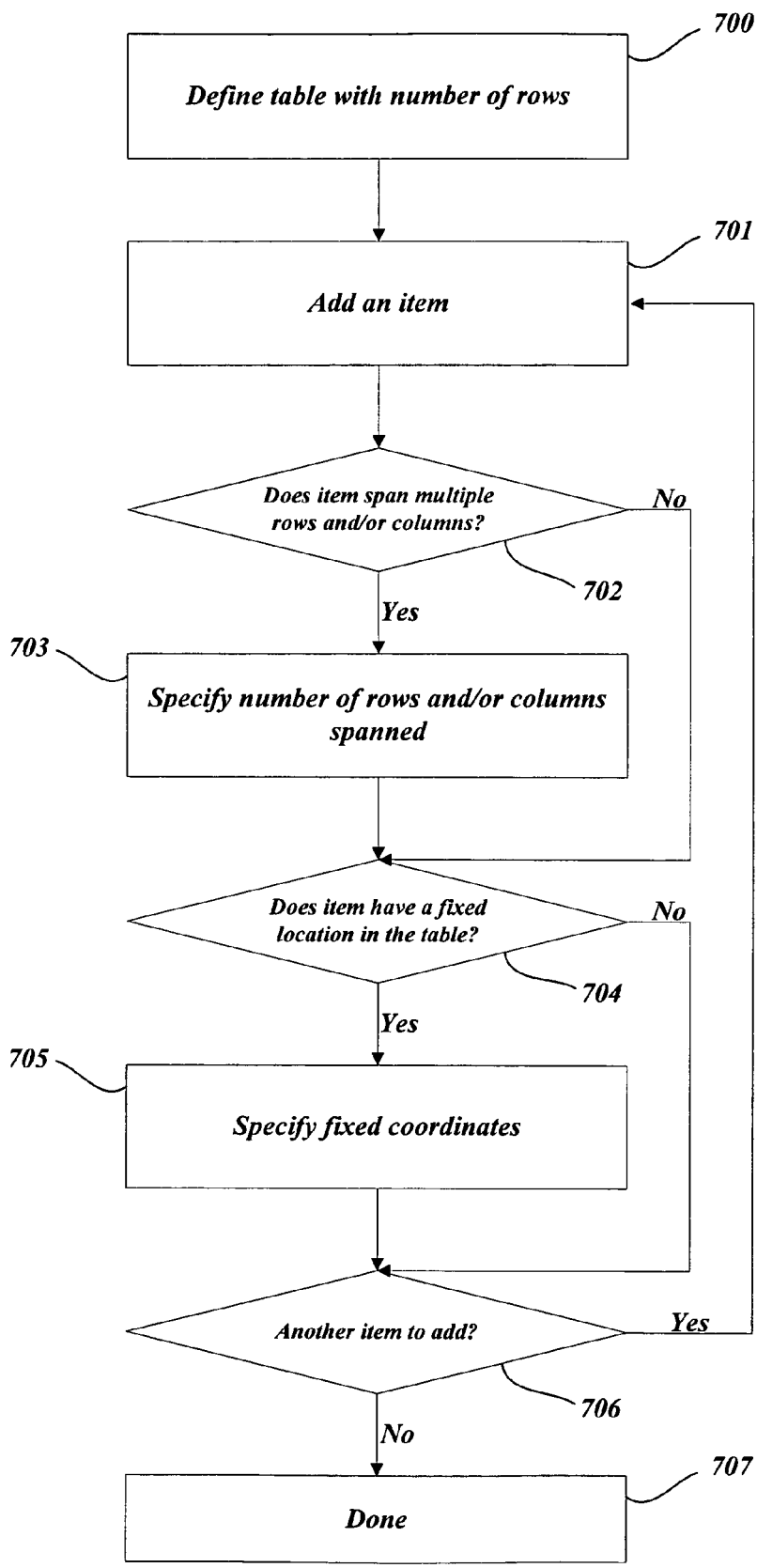
FIG. 7 illustrates a more detailed sequence of steps for generating the code for a table with a specified number of rows, wherein the code defines items of various sizes and items with fixed positions.

FIG. 7 outlines the coding procedure for tables with both variably sized items and fixed items in a situation where a number of rows, rather than columns, are specified for a table. With reference to FIG. 7, a table may be defined with a number of rows 700. Next, as represented by steps 701-706, a plurality of items can be identified 701, each with a size defined by a number of columns and/or rows 702-703. A single row and single column items size can be a default size that does not require specification of an item size. Further, coordinates may be specified for items with fixed positions 704-705. Items without coordinates may be considered moveable items as a default.

Figure 8:
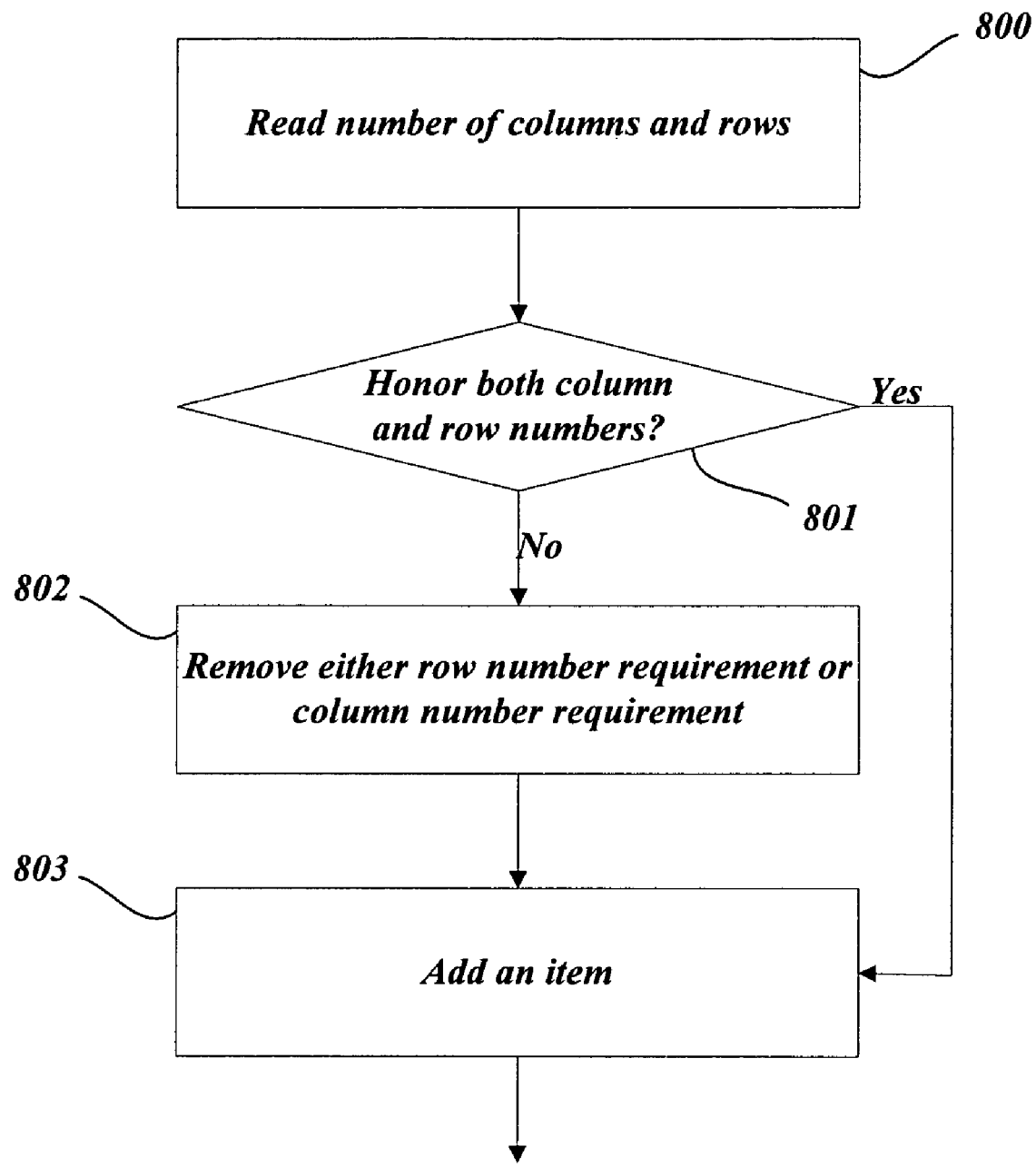
FIG. 8 illustrates a modification that can be made to accommodate a specification of both columns and rows.
Figure 9:
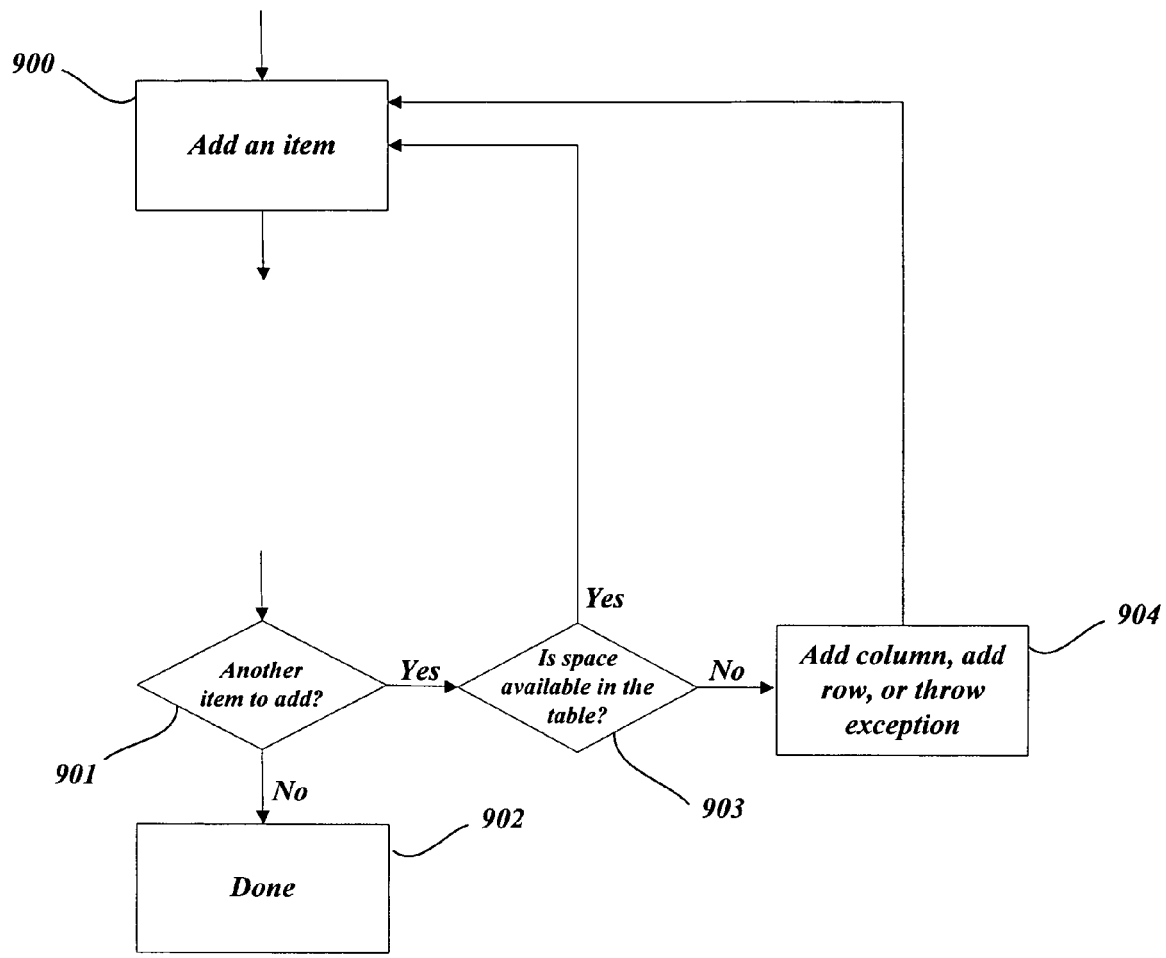
FIG. 9 illustrates a further modification that can be made to accommodate a specification of both columns and rows.

Various embodiments of the invention may be configured to allow a specification of both a number of rows and a number of columns, while other embodiments may not allow a specification of both. This choice is reflected in FIG. 8 and FIG. 9. FIG. 8 shows that, as one portion of the processes engaged in by the API, it may determine whether to honor the specification of both row and column numbers 801. If both are not honored, then one specification or the other must be removed 802. This can be accomplished by giving a user the option of which to remove, or by removing one number or the other as a matter of course.

In general, when both a number of columns and a number of rows are specified, a declaration such as the following may be used:
Table.ColumnCount=2
Table.RowCount=2

This will visually create a blank table like so:

|   |   |
|---|---|
|   |   |

Then you can add 4 new "movable" elements to fill the table. For example:
Table.Controls.Add(button1);
Table.Controls.Add(button2);
Table.Controls.Add(button3);
Table.Controls.Add(button4);
Which may fill the created table above like so:

| [button 1] | [button 2] |
|---|---|
| [button 3] | [button 4] |

A question arises as to what should occur when a 5<sup>th</sup> movable element is added to the table. Three options are available:

- option 1: add a new column—for example by specifying "GrowStyle.AddColumn"
- option 2: add a new row—for example by specifying "GrowStyle.AddRow"
- option 3: say this state is invalid, the table is already full—for example by specifying "GrowStyle.Fixed"

Similar logic may be used for placing a fixed element outside a current number of rows and columns. For example, consider the 2×2 table again:

If a fixed element is added to the above table as follows:
tableLayoutPanel1.Controls.Add(button1, 0, 2);

The effect is to try to add the control into the first column, but the third row. Remember, arguments 0,2 mean first row, third column, because, in this example, we start counting from 0, not 1.

In this case, if GrowStyle is set to AddRows, the number of rows in the table can grow to accommodate the fixed element:

The above embodiment, namely wherein a row, rather than a column is added where a fixed element demands an extra column but the grow style has been set to add rows, is considered a preferred arrangement. The converse can be implemented when a fixed element has demanded an extra row but the grow style is set to add columns. One reason for using this implementation is it allows users to specify a number of rows and columns that is greater than the number of items that they may have, and thereby leave blank space in a table.

If the API does honor the specification of both row numbers and column numbers, then a decision must be made as to which will trump in the event of a conflict. If there are too many items for the available positions in a table, additional rows or columns can be added, deviating from the specified numbers, or an error can be generated. This process is reflected in FIG. 9. Decision 903 can be implemented as a part of the processes when both column and row numbers are honored. If available space in a table runs out, process 904 can determine a "grow direction" or whether to add additional columns, rows, or alternate column/row, column/row. Alternatively, an error can simply be generated if space runs out.

The operation of the novel API and exemplary code to access the functions thereof are set forth above. A complimentary aspect of the invention is an algorithm developed for placing the identified items in a table. The API discussed above may be used in conjunction with a wide variety of algorithms to accomplish the placement of moveable items in tables in accordance with the techniques of the invention, and the invention is not limited to the use of the particular algorithm set forth here.

Figure 10:
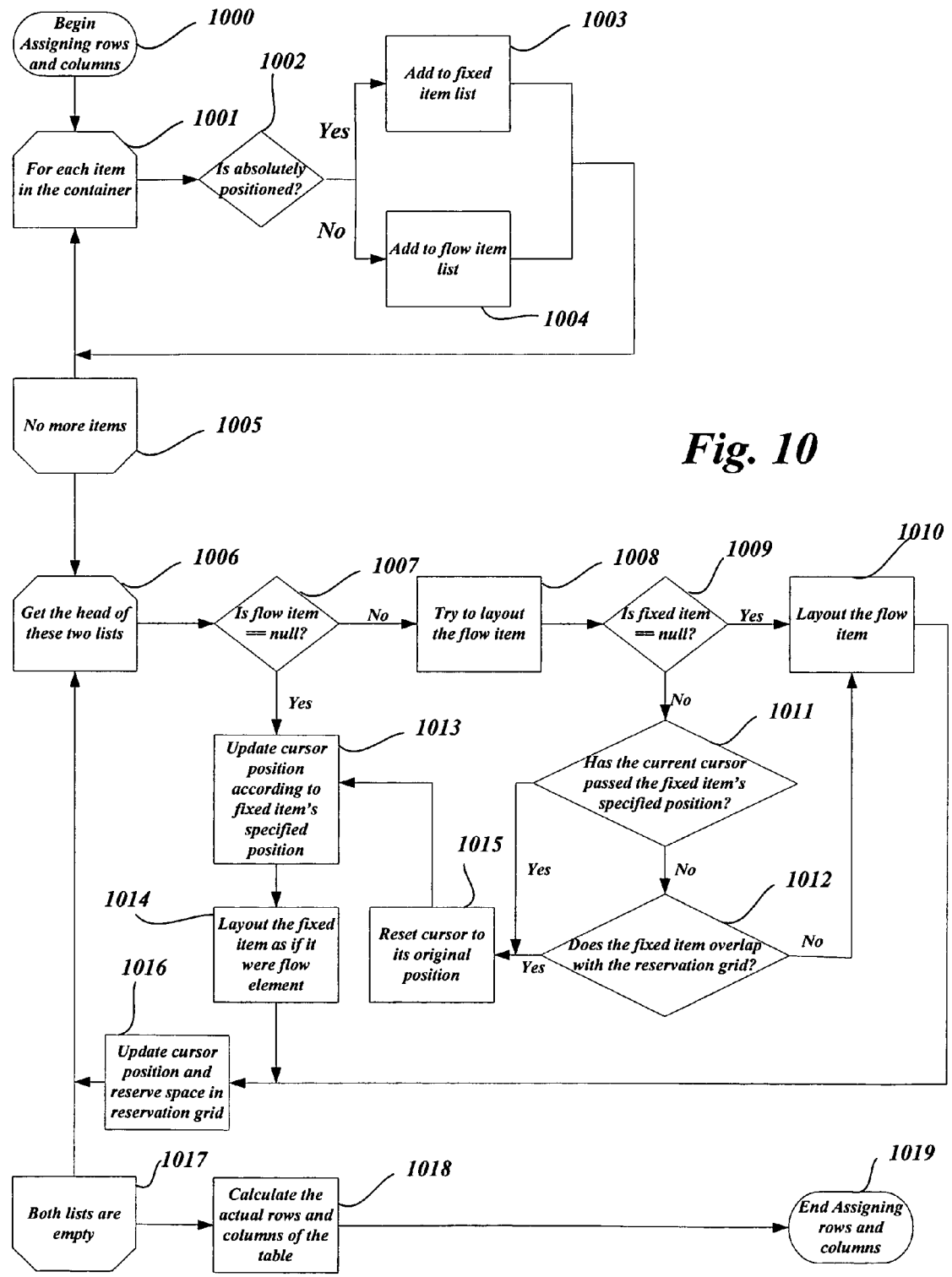
FIG. 10 is a flow chart that illustrates an exemplary algorithm for placing both fixed and moveable items in a tabular layout.
Figure 11:
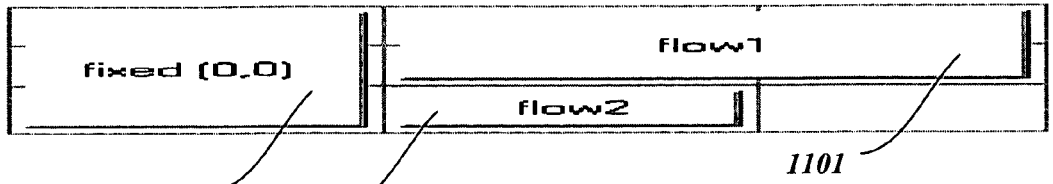
FIG. 11 illustrates an exemplary tabular layout, which is used as a reference to explain the algorithm of FIG. 10.

FIG. 10 provides a flow chart that generally illustrates the steps of an exemplary preferred algorithm in accordance with the techniques of the invention. The various steps set forth in FIG. 10 may be understood with reference to the example provided in FIG. 11. The example in FIG. 11, in turn, provides a graphic representation of a table that may be implemented in code for use with the API provided above. Exemplary code representing FIG. 11 is as follows:

```
this.tableLayoutPanel1.Columns = 3;
// rows 1 & 2
this.tableLayoutPanel1.Controls.Add(this.fixed, 0, 0);
this.tableLayoutPanel1.SetRowSpan(this.fixed, 3);
this.tableLayoutPanel1.Controls.Add(this.flow1);
this.tableLayoutPanel1.SetColumnSpan(this.flow1, 2);
this.tableLayoutPanel1.SetRowSpan(this.flow1, 2);
// row 3
this.tableLayoutPanel1.Controls.Add(this.flow2);
```

In the above code, "flow" is used to identify moveable items Flow1 1101 and Flow2 1102, while "control" is used to identify items generally, and "fixed" is used to identify fixed item 1100 at coordinates (0,0). One goal of an exemplary algorithm for positioning the above identified elements is that of mixing moveable and fixed elements and assigning row and column positions to the moveable elements so they "flow around" the fixed elements. Another goal is to remain aware of the sizes of items as indicated by the exemplary column span and row span properties specified in the code, while at the same time using minimal minimum memory resources to do so.

As a first part of initiating the steps of the algorithm illustrated in FIG. 10, various embodiments of the invention may be configured to separate identified moveable and fixed items into two lists 1000-1004. Various embodiments may optimize the separation process by simply pulling one type of item out of the original list of identified items, for example, by copying all fixed items to a new list, while leaving all moveable items in the original list. The original list and the fixed item list may then be used as the two lists. The process that reads the moveable items list may be configured to ignore any items that are identified as fixed.

The moveable item list may be sorted by an order of insertion into the table, understanding that the order may be modified if a moveable item cannot fit into an available position in the table while another moveable item can fit in the available position. The fixed item list may be sorted by the specified locations of the controls in a row-major, column-minor order. In configurations of the invention where items are placed in an order other than row-major, column minor, the fixed item list may be sorted according to the new order. Assume for the purposes of the following discussion that the code defining the table and identifying items for placement therein specified a number of columns (not rows) and that the order of positioning is row-major, column-minor.

The algorithm can progress by placing a cursor at positions in a target table, investigating the status of the position identified by the cursor, and determining an appropriate action, such as placing a fixed item, placing a moveable item, or passing over the position. FIG. 12 shows an exemplary table with a cursor 1200 at a first position 1210a. To the right of the table in FIG. 12, the top items in the two lists 1201 and 1202 are illustrated. For a position identified by the cursor 1200, the algorithm can determine if placement of an item from 1201 or 1202 is appropriate.

Referring back to FIG. 10, the algorithm may proceed by comparing the items at the beginning of both lists, or queues 1006. The item at the top of the moveable items list 1202 is Flow1 1101, as can be determined by referring to the code example above. Flow1 1101 is defined as having a size property ColumnSpan=2. Flow1 1101 could fit at the cursor point 1210a indicated by cursor 1200 in FIG. 12, however, referring to the fixed item list 1201, or queue, it is apparent that there is a fixed item 1100 assigned to position 1210a. The coordinates of 1210a are (0,0) because this position is the top left corner of the table. Thus, the fixed item 1100 with coordinates (0,0) takes precedence and is placed at 1210a.

Figure 12A:
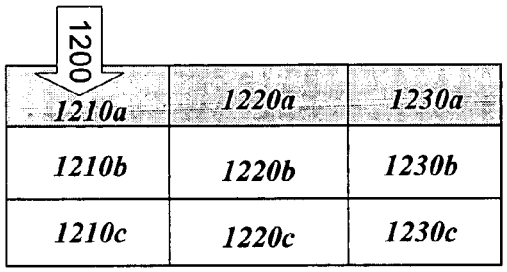
FIG. 12a illustrates the head items of two lists that are generated in connection with FIG. 10, and a cursor at a table position that is used to mark the position for insertion of an item or performance of some other action at that position.
Figure 12A:
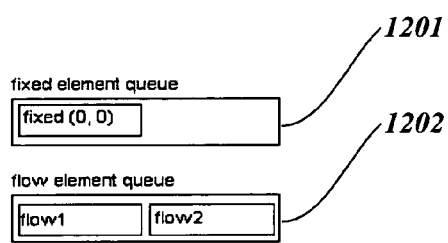
Figure 12B:
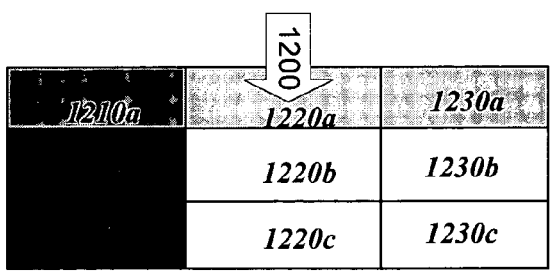
FIG. 12b illustrates another view of FIG. 12a, in which various positions in a table have been reserved, and the cursor has moved to a new position.
Figure 12B:
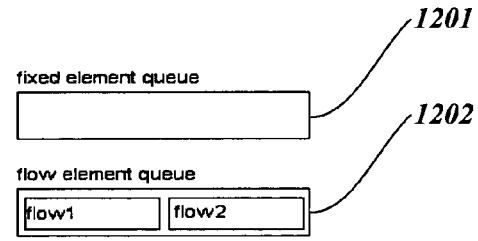

Upon determining that fixed item 1100 is to be placed in position 1210a, the algorithm can reserve space for the fixed item 1100 and advance the cursor 1200 column-wise to 1220a, or coordinates (1,0). This step is illustrated in FIG. 12b. Refer to a discussion of systems and methods for reserving positions, below, for further detail on techniques for reserving positions. Again, the algorithm can check lists 1201 and 1202 to determine what action to take regarding the cursor 1200 position. In our example, there is not any fixed item with coordinates (1,0), so an item from the moveable item list 1202 can be placed in this position 1220a. Flow1 1101, which is of size ColumnSpan=2 and RowSpan=2, does fit at (1,0) and there is no fixed element that occupies this area, so Flow1 1101 may be placed at position 1220a. Placing Flow1 1101 in the 1220a position fills the remaining columns in the first row of the table, so these cells 1220a, 1230a can be reserved and the algorithm can move the cursor 1200 to a next row in the table. The cursor 1200 may be moved to the next available position 1220c. In other words, the cursor 1200 wraps around as it is advanced column-wise, skipping the cells 1230a, 1210b, 1220b, 1230b, and 1210c reserved by other items. The entire 2nd row is skipped because fixed item 1100 and Flow1 1101 had already reserved every cell in the row. The cursor 1200 finally finds free space at coordinates (1,2) 1220c. The algorithm can again check the lists 1201, 1202 for items to place in this available position. There is no fixed item designating position 1220c, so the next moveable item, Flow2 1102, is placed in 1220c.

Figure 14:
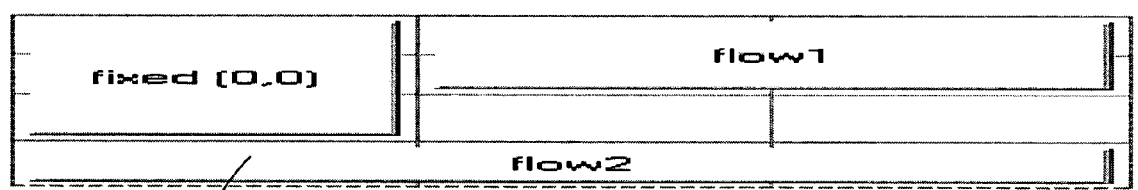
FIG. 14 illustrates various embodiments of the invention in which positions are left blank when there are no moveable items of appropriate size for the position, and in which an item may have a truncated size to fit within the specified size of a table.

FIG. 14 displays a result that may occur in the above example if Flow2 (labeled 1400 in FIG. 14) had a ColumnSpan of three columns instead of one column. In this case, the cursor 1200 could have been advanced to a next row, leaving 1220c and 1230c from FIG. 12 empty. Flow2 1400 would require three columns, and in this example there are no other moveable or fixed items to place in 1220b or 1230c. Therefore, the larger sized Flow2 1400 could be placed in its own row as shown in FIG. 14.

In various other embodiments, items may be truncated if their size is larger than a specified size for the table. For example, if Flow2 1400 happened to have a ColumnSpan of 4 or greater, it could be moved to the beginning of its own row and then its horizontal size could be truncated to three columns, since the number of columns specified for the table may be considered a hard limit set for the table. In such embodiments of the invention, the result when Flow2 144 has a size of four or more columns could be the same as when it had a three column size, as illustrated in FIG. 14.

Figure 12C:
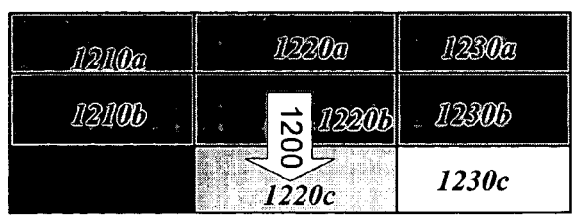
FIG. 12c illustrates yet another view of FIG. 12a, in which various positions in a table have been reserved, and the cursor has moved to a new position.
Figure 12C:
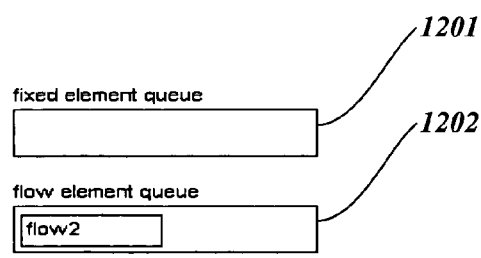
Figure 13:
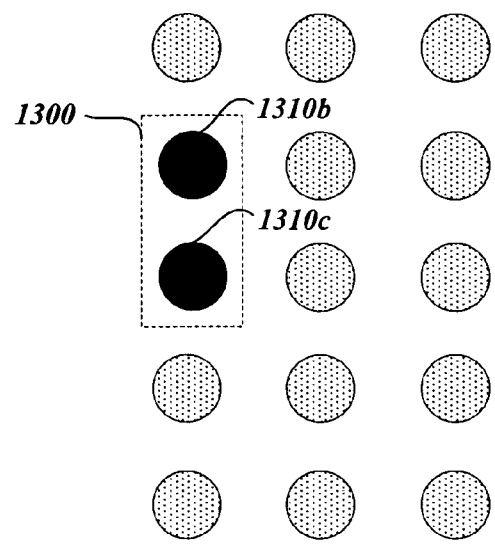
FIG. 13 illustrates an on-demand reservation system in the form of a bit array.

FIG. 13 illustrates various embodiments of a reservation system and method for use with the invention. To accommodate the larger size of items such as 1100 in the layout process, a reservation system and method can be used to reserve space in the table for the additional rows and/or columns consumed by an item. FIG. 13 illustrates a bit array that can grow and shrink as necessary to reserve locations in a table. The grey bits are not used, while the black bits 1310b, 1310c are used to indicate reserved positions. A bit in the bit array can correspond to a position in the table depicted in FIG. 12a-FIG. 12c.

Column positions can be easily reserved using one bit per cell in a given row, and no bit array is necessary. Thus, when Flow1 1101 is placed, a single bit may be used to mark table position 1230a as reserved, and the algorithm can pass over this location. Row reservations are somewhat less straightforward, and can be accomplished using a sliding window approach.

To explain the sliding window approach, refer back to FIG. 12a and FIG. 12b. In FIG. 12a, the cursor 1200 starts at position 1210a. No items have yet been placed, so the reservation grid can have no rows allocated. In FIG. 12b, fixed item 1100 has been placed, and spans multiple rows. These cells are reserved in the reservation grid 1300 as shown in FIG. 13. The reservation grid of 13 is two bits tall because the first cell of the row span needed for fixed item 1100 is already accounted for by advancing the cursor 1200. The grid 1300 is one bit wide, because the number of rows in the reservation grid can be configured to grow only on demand, thereby minimizing memory resources. Note that the grey bits in FIG. 13 are not a part of the reservation grid 1300 at this point, and are illustrated only as placeholders. If position 1230b had been reserved, then the size of the bit array would grow to three-bit rows by default to adequately include sufficient information about the table position reservations.

In FIG. 12c, the cursor 1200 has been advanced past the first row of the table, so the top bit in the reservation grid can be released. This top bit no longer serves any purpose, because the cursor has advanced beyond the corresponding location in the table. This conservation of memory allows support of RowSpanning in our positioning algorithm without allocating a large amount of memory up front, and without knowing how many rows there will be in a table.

Exemplary Computing and Network Environment

Figure 2A:
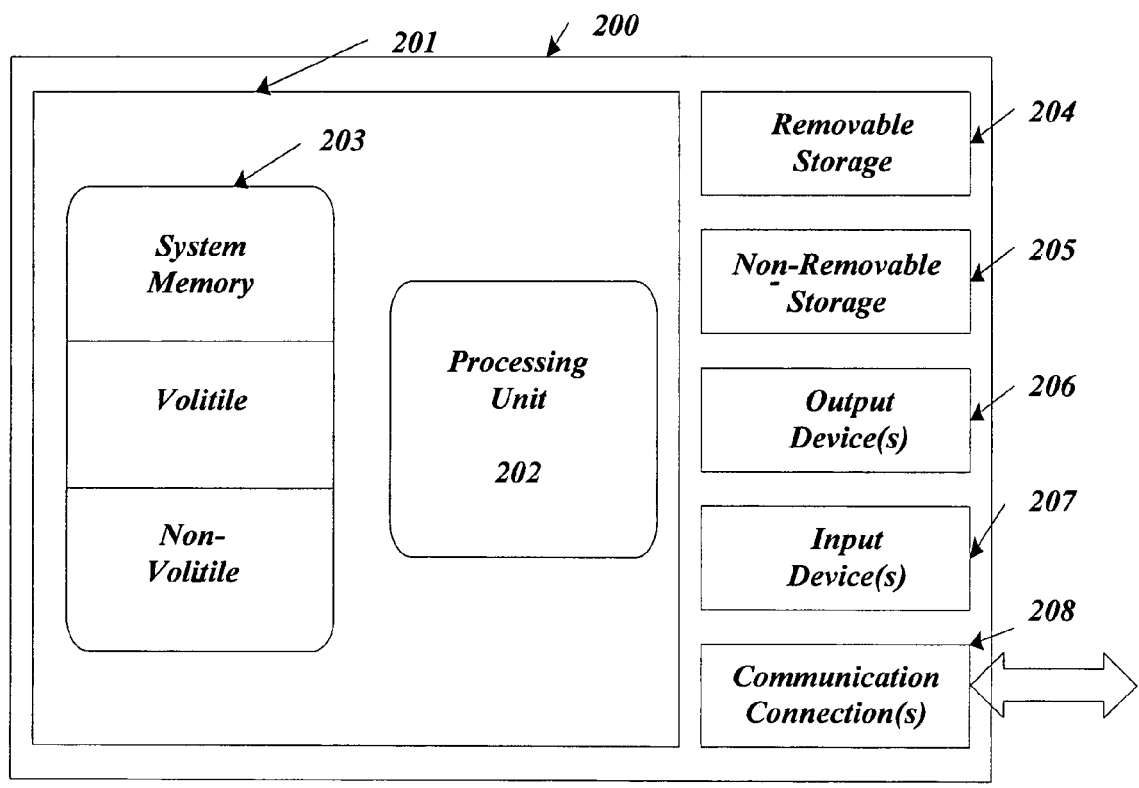
FIG. 2a is a block diagram broadly representing the basic features of an exemplary computing device suitable for use in conjunction with various aspects of the invention.

With reference to FIG. 2a, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

Figure 2B:
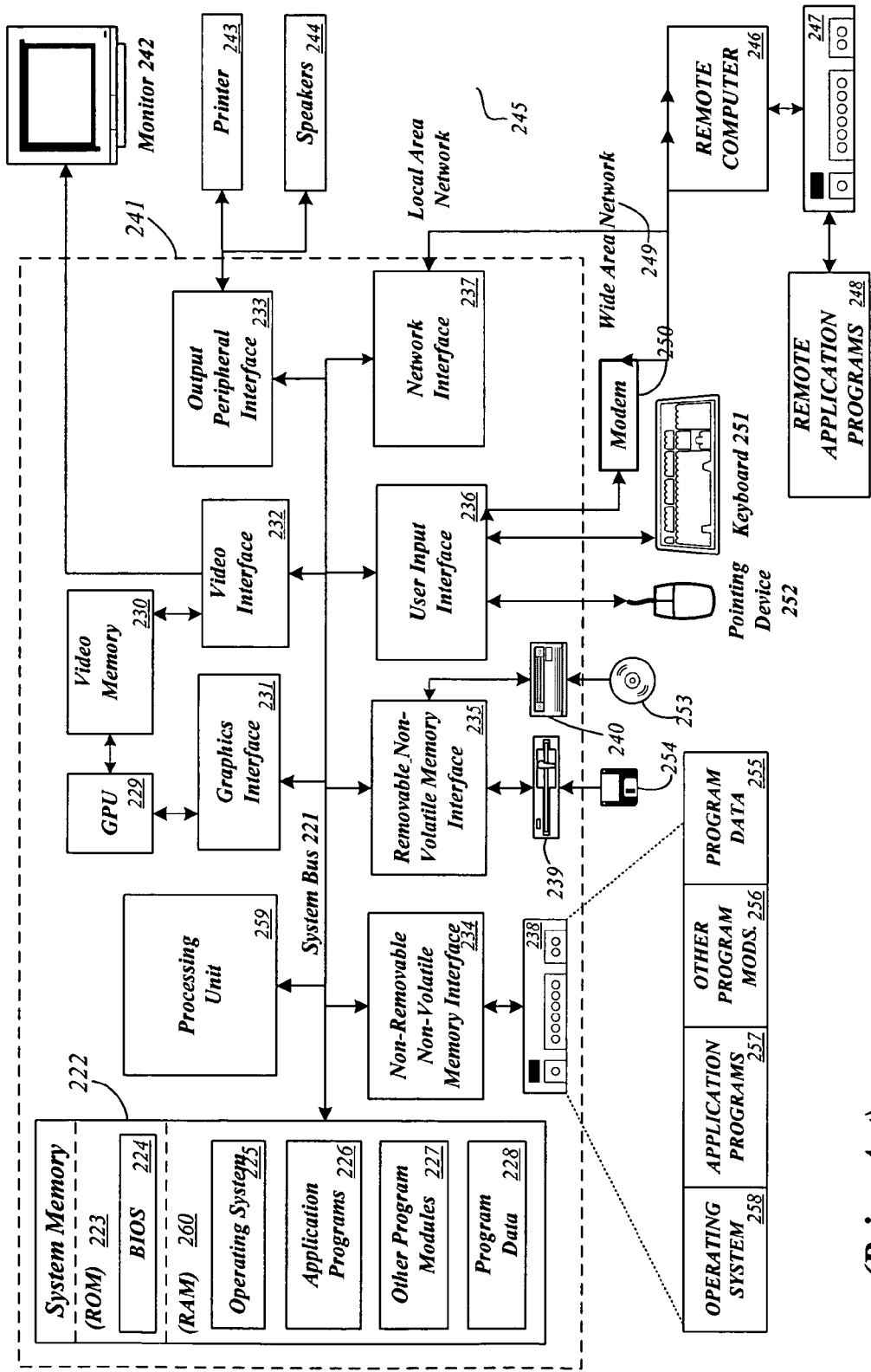
FIG. 2b is a block diagram representing a more detailed exemplary computing device suitable for use in conjunction with various aspects of the invention.

FIG. 2b illustrates a somewhat more detailed example of a suitable computing device from FIG. 2a and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2b, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 1A:
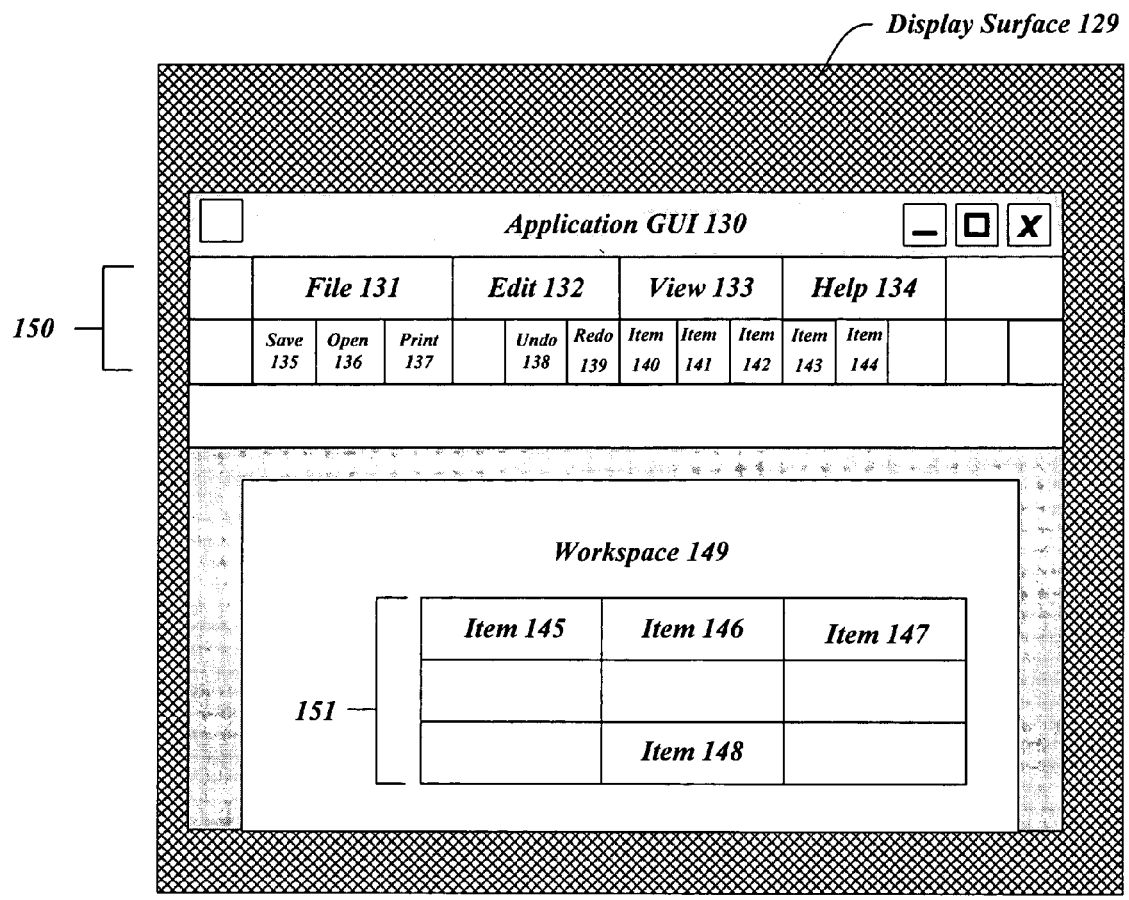
FIG. 1a illustrates a prior art Graphical User Interface (GUI) 130 on a visual surface 129 that displays a tabular layout 150 for items 131-144.
Figure 1B:
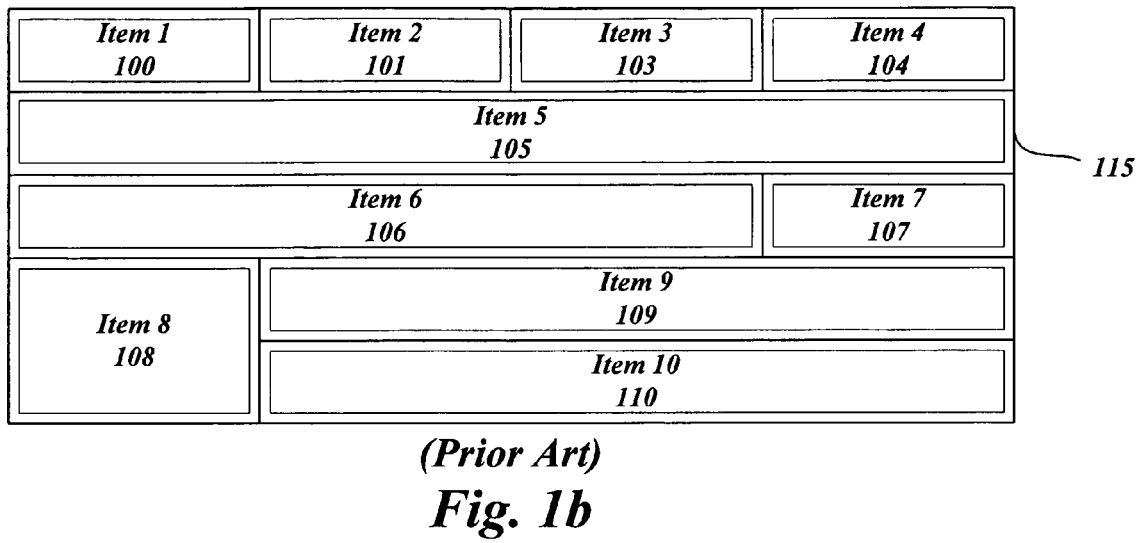
FIG. 1b illustrates a prior art detailed view of an exemplary tabular layout 115 with items 100-110 arranged in various positions within the tabular layout 115.
Figure 1C:
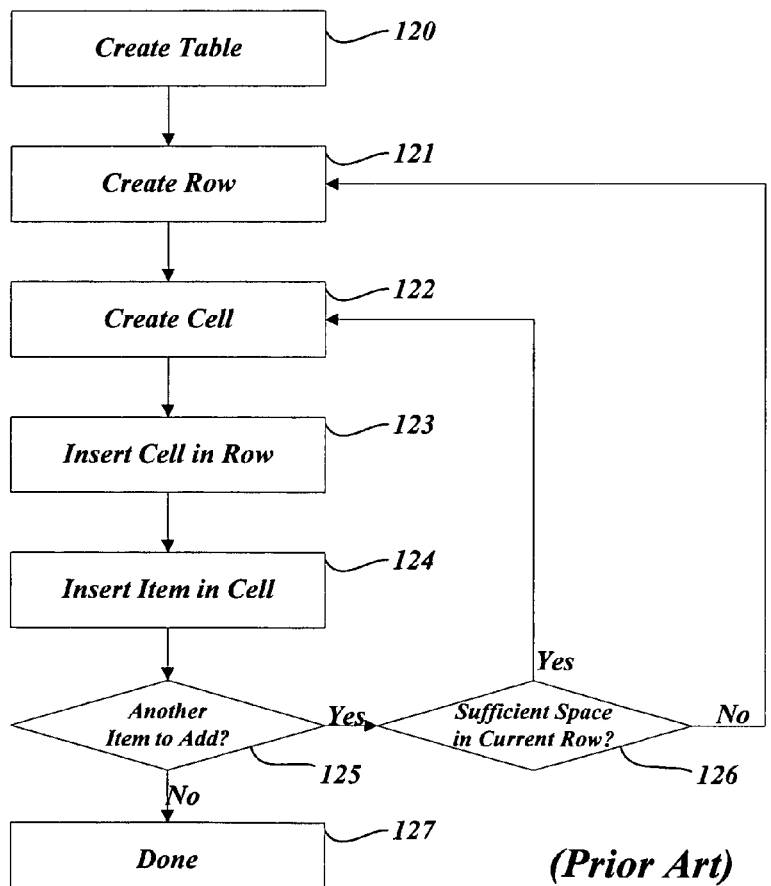
FIG. 1c illustrates a prior art process for creating code to generate a tabular layout.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2b, provide storage of computer readable instructions, data structures, program modules and other data for the computer 241. In FIG. 2b, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2*b* illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2C:
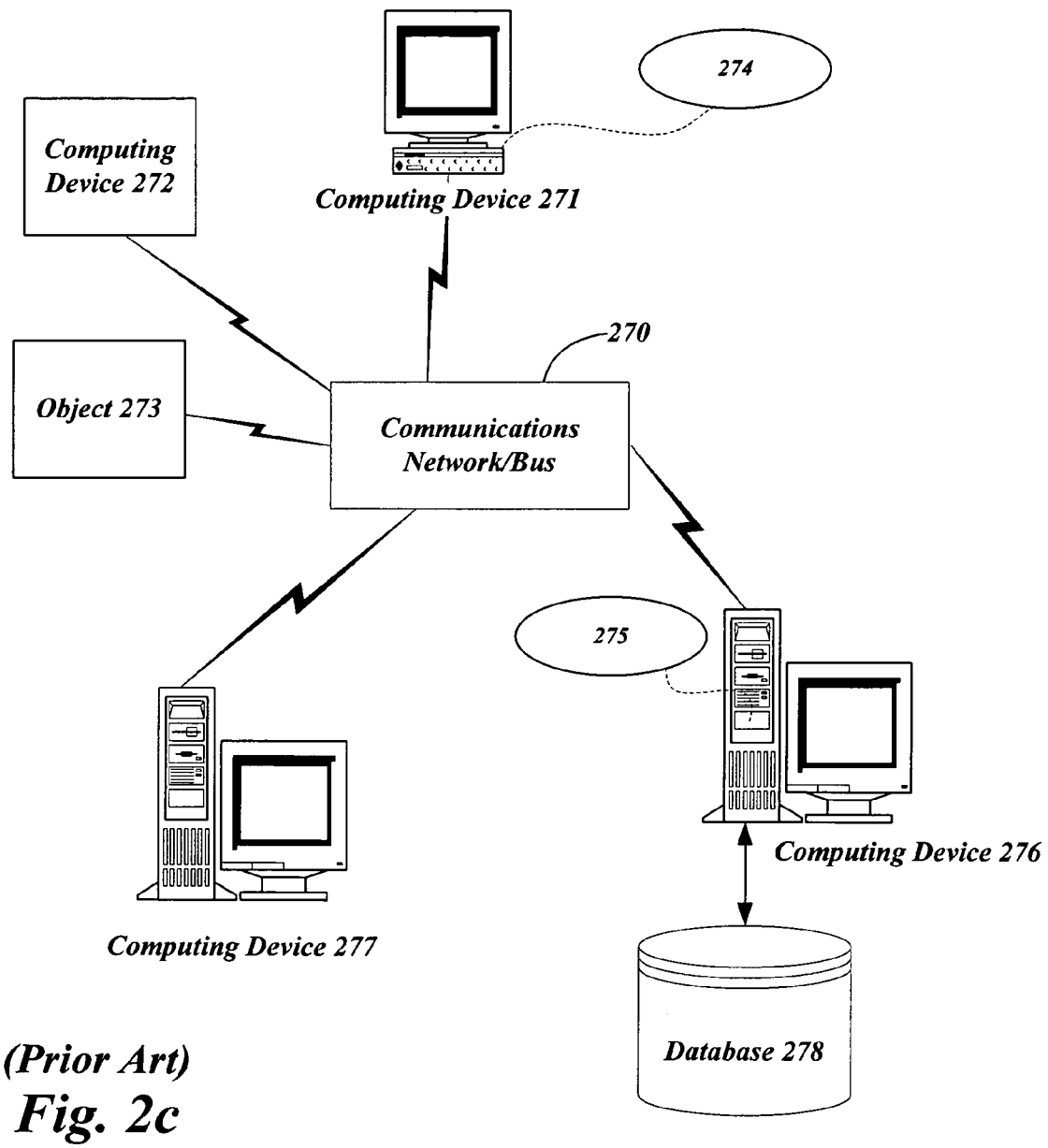
FIG. 2c illustrates an exemplary networked computing environment in which may computerized processes, including those of the invention, may be implemented.

An exemplary networked computing environment is provided in FIG. 2*c*. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2*c* provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2*c*, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2*c*, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A method for positioning Graphical User Interface (GUI) control button items in a tabular layout, the method comprising:
   reading at least one list that identifies a plurality of GUI control button items to be placed in a tabular layout;
   determining that a first position in the tabular layout is not reserved by a fixed GUI control button item from said at least one list, wherein said fixed GUI control button item is associated with a fixed position in said tabular layout;
   placing a moveable GUI control button item from said at least one list in said first position, wherein the moveable GUI control button item is not associated with a fixed position in said tabular layout; and
   reserving said first position in an on-demand reservation grid comprising a bit array,
   wherein each bit in the bit array corresponds to a position in the tabular layout, and
   wherein the size of the bit array increases or decreases based upon reservation information of the tabular layout.

2. The method of claim 1, wherein said at least one list comprises a first list comprising a plurality of moveable GUI control button items and a second list comprising a plurality of GUI control button fixed items.

3. The method of claim 2, further comprising generating said first list or said second list from an original list.

4. The method of claim 3, wherein said generating comprises placing either said moveable GUI control button items or said fixed GUI control button items in a new list, and ignoring GUI control button items in the new list when reading the original list.

5. The method of claim 2, further comprising ordering said fixed GUI control button items in said second list to reflect an order in which a process that serially identifies positions in the tabular layout will identify positions associated with the fixed GUI control button items.

6. The method of claim 1, wherein said reserving comprises altering at least one bit in the bit array.

7. The method of claim 1, further comprising reserving additional positions in the on-demand reservation grid if said moveable GUI control button item placed in said first position spans multiple positions in the tabular layout.

8. The method of claim 7, further comprising determining a next available position in the tabular layout by referencing the on-demand reservation grid.

9. A method for positioning Graphical User Interface (GUI) control button items in a tabular layout, the method comprising:
   reading at least one list that identifies a plurality of GUI control button items to be placed in a tabular layout;
   determining whether a position in the tabular layout is reserved;
   when said position in the tabular layout is reserved, determining whether a next position in the tabular layout is reserved;
   when said position in the tabular layout is not reserved, placing a moveable GUI control button item in said position, wherein the moveable GUI control button item is not associated with a fixed position in said tabular layout; and
   reserving said position in an on-demand reservation grid comprising a bit array,
   wherein each bit in the bit array corresponds to a position in the tabular layout, and
   wherein the size of the bit array increases or decreases based upon reservation information of the tabular layout.

10. The method of claim 9, wherein said at least one list comprises a plurality of fixed GUI control button items associated with fixed positions in said tabular layout.

11. The method of claim 9, wherein said reserving comprises altering at least one bit in the bit array.

12. The method of claim 9, further comprising placing a fixed GUI control button item in said position when said position is reserved by the fixed GUI control button item.

13. The method of claim 12, further comprising reserving additional positions in the on-demand reservation grid when said moveable GUI control button item spans multiple positions in the tabular layout.

14. The method of claim 13, further comprising determining a next available position in the tabular layout for placement of a GUI control button item by referencing the on-demand reservation grid.

15. A computer readable storage medium having computer executable instructions for positioning Graphical User Interface (GUI) control button items in a tabular layout, the computer-executable instructions comprising instructions for:
   reading at least one list that identifies a plurality of GUI control button items to be placed in a tabular layout;
   determining that a first position in the tabular layout is not reserved by a fixed GUI control button item from said at least one list, wherein said fixed GUI control button item is associated with a fixed position in said tabular layout;
   placing a moveable GUI control button item from said at least one list in said first position, wherein the moveable GUI control button item is not associated with a fixed position in said tabular layout; and
   reserving said first position in an on-demand reservation grid comprising a bit array,
   wherein each bit in the bit array corresponds to a position in the tabular layout, and wherein the size of the bit array increases or decreases based upon reservation information of the tabular layout.

16. The computer readable storage medium of claim 15, wherein said at least one list comprises a first list comprising a plurality of moveable GUI control button items and a second list comprising a plurality of fixed GUI control button items.

17. The computer readable storage medium of claim 16, further comprising instructions for generating said first list or said second list from an original list.

18. The computer readable storage medium of claim 17, wherein said instructions for generating comprise instructions for placing either said moveable GUI control button items or said fixed GUI control button items in a new list, and instructions for ignoring GUI control button items in the new list when reading the original list.

19. The computer readable storage medium of claim 16, further comprising instructions for ordering said fixed GUI control button items in said second list to reflect an order in which a process that serially identifies positions in the tabular layout will identify positions associated with the fixed GUI control button items.

20. The computer readable storage medium of claim 15, wherein said instructions for reserving comprise instructions for altering at least one bit in the bit array.

21. The computer readable storage medium of claim 15, further comprising instructions for reserving additional positions in the on-demand reservation grid if said moveable GUI control button item placed in said first position spans multiple positions in the tabular layout.

22. The computer readable storage medium of claim 21, further comprising instructions for determining a next available position in the tabular layout by referencing the on-demand reservation grid.

23. A computer readable storage medium having computer-executable instructions for positioning Graphical User Interface (GUI) control button items in a tabular layout, the computer-executable instructions comprising instructions for:

reading at least one list that identifies a plurality of GUI control button items to be placed in a tabular layout;
determining that a position in the tabular layout is reserved;
determining, when said position in the tabular layout is reserved, whether a next position in the tabular layout is reserved;
placing, when said position in the tabular layout is not reserved, a moveable GUI control button item in said position, wherein a moveable GUI control button item is not associated with a fixed position in said tabular layout; and
reserving said position in an on-demand reservation grid comprising a bit array,
wherein each bit in the bit array corresponds to a position in the tabular layout, and
wherein the size of the bit array increases or decreases based upon reservation information of the tabular layout.

24. The computer readable storage medium of claim 23, wherein said at least one list comprises a plurality of fixed GUI control button items associated with fixed positions in said tabular layout.

25. The computer readable storage medium of claim 23, wherein said instructions for reserving comprise instructions for altering at least one bit in the bit array.

26. The computer readable storage medium of claim 23, further comprising instructions for placing a fixed GUI control button item in said position when said position is reserved by the fixed GUI control button item.

27. The computer readable storage medium of claim 26, further comprising instructions for reserving additional positions in the on-demand reservation grid when said moveable GUI control button item spans multiple positions in the tabular layout.

28. The computer readable storage medium of claim 27, further comprising instructions for determining a next available position in the tabular layout for placement of a GUI control button item by referencing the representation of the tabular layout.

* * * * *

UNITED STATES PATENT AND TRADEMARK OFFICE
CERTIFICATE OF CORRECTION

| | | |
|---|---|---|
| PATENT NO. | : 7,500,186 B2 | Page 1 of 1 |
| APPLICATION NO. | : 10/929861 | |
| DATED | : March 3, 2009 | |
| INVENTOR(S) | : Daniel Ryan Lehenbauer et al. | |

It is certified that error appears in the above-identified patent and that said Letters Patent is hereby corrected as shown below:

In column 17, line 63, in Claim 5, delete "fun her" and insert -- further --, therefor.

Signed and Sealed this
Third Day of May, 2011

David J. Kappos
*Director of the United States Patent and Trademark Office*